June 24, 1947. D. N. DAVIES ET AL 2,422,953
PROCESS AND APPARATUS FOR EXTRUDING
Filed Nov. 23, 1943   3 Sheets-Sheet 1
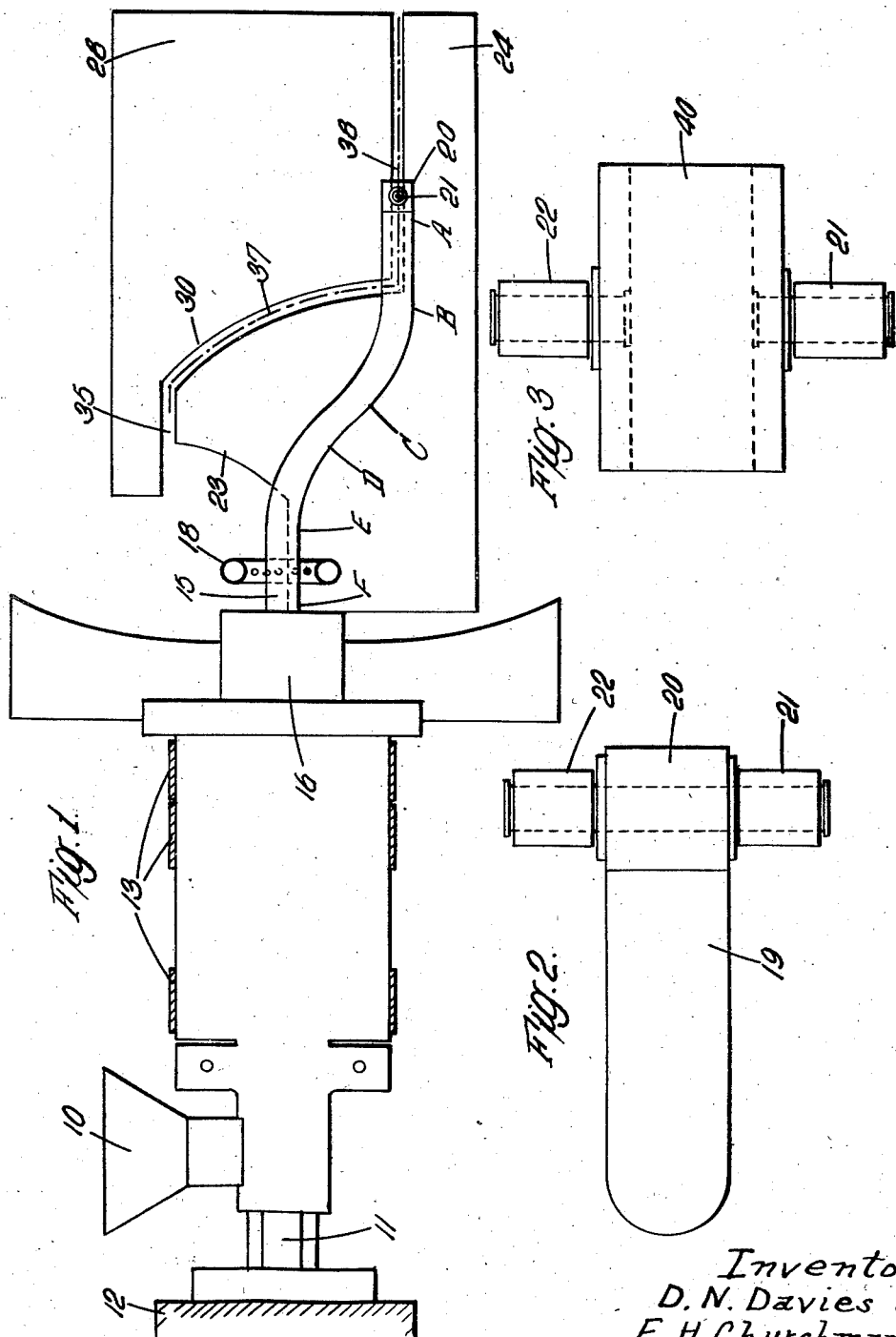
Inventors,
D. N. Davies and
F. H. Churchman
By Young, Emery & Thompson
Attys.

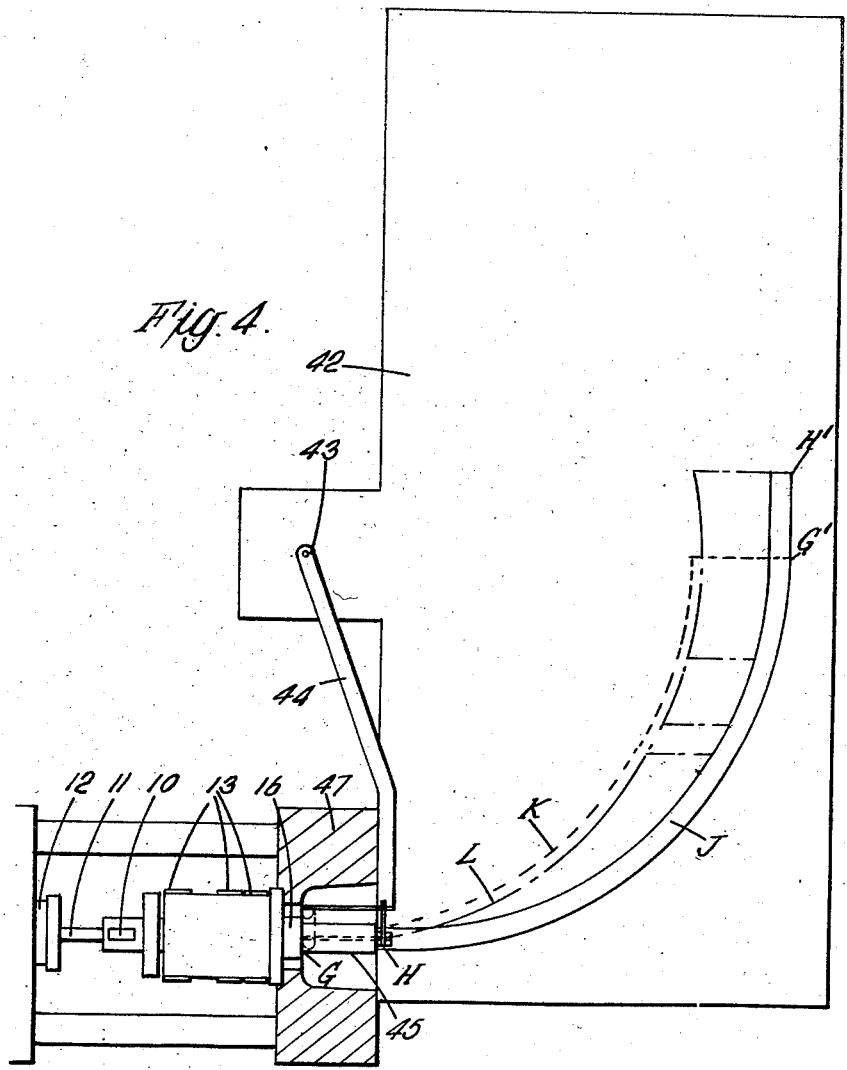

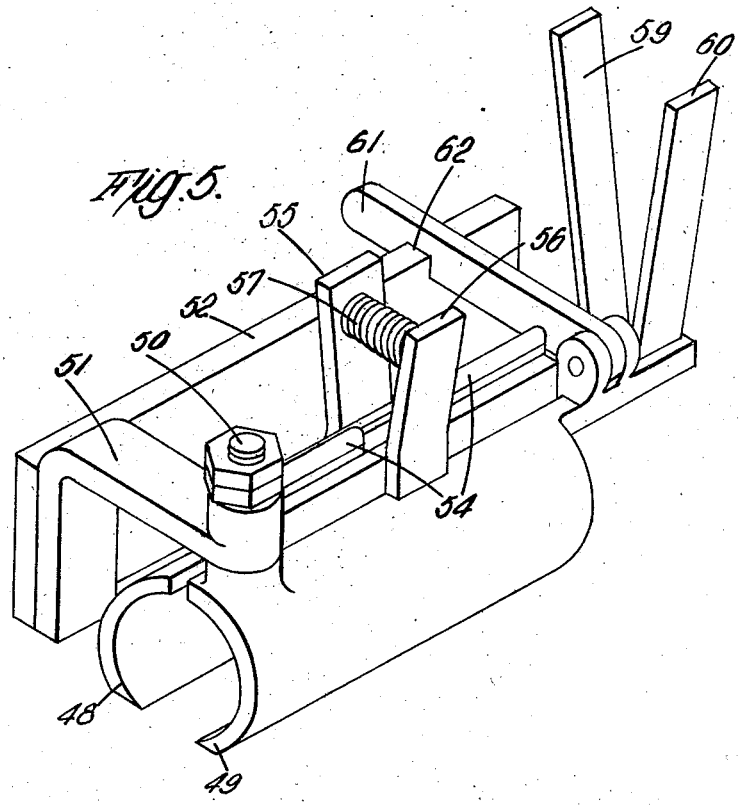
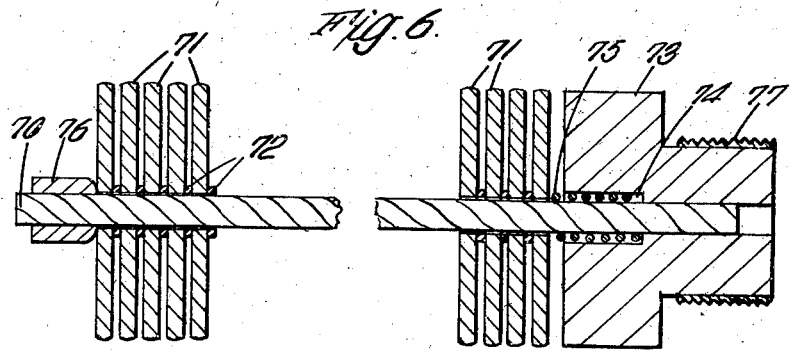

Patented June 24, 1947

2,422,953

UNITED STATES PATENT OFFICE 2,422,953

PROCESS AND APPARATUS FOR EXTRUDING

Drury Norman Davies and Frederick Henry Churchman, Feltham, England, assignors to Cellomold Limited, Feltham, Middlesex, England, a British company Application November 23, 1943, Serial No. 511,442
In Great Britain December 14, 1942

12 Claims. (Cl. 18—12)

This invention relates to extrusion processes and is applicable to the extrusion of thermoplastic and thermosetting resins, metals, and other extrudable substances, all hereinafter referred to as "material." As the material issues from the nozzle of the extruding machine it is, or can be arranged to be, sufficiently plastic to be capable of being curved into various shapes. The invention is especially intended for extruding phenolic-aldehyde thermosetting resinous composition and we find that such compositions are sufficiently plastic to be bent (although substantially hardened towards the final resite stage) for a short time until the material cools e. g. over a length of two or three inches from the extrusion nozzle. If a single radius bend is required in each extruded article this can be effected comparatively simply. If, however, an S bend or numerous bends are required in each article this presents the difficulty that if the material is extruded into a channel of the required shape each piece of the material will be bent first in one direction and then in the opposite direction which has a weakening effect on the finished material. Alternative arrangements to overcome this difficulty are apt to be complicated. We have, however, now developed a method whereby the extruding material can be shaped into any number of bends of the same or different size and with straight portions between them if required and with bends in two or more planes without bending each piece of material more than once and the means provided to accomplish this are simple to construct and operate.

According to the invention the process consists in producing a required shape from the extruding material which thereupon becomes rigid, guiding this rigid part of the extrusion by attaching it to a device which is guided in an accurately predetermined path to cause the extruding and still deformable material progressively as it extrudes to assume an accurately predetermined shape, thereby producing an integral extrusion without substantial deformation of any part of the extrusion after it has been so shaped. The extrusion may consist of at least two or more different shapes or a continuous uniform curve, for example a straight part may be produced followed by a curve, or two curves of different shapes can be made.

The above and other features of the invention specifically set forth in the appended claims will be hereinafter described and in order that the invention may be clearly understood and readily carried into effect, two methods of carrying it into effect will now be described by way of example with reference to the accompanying diagrammatic drawings wherein:

Figure 1 is a side elevational view of part of an extrusion apparatus together with bending equipment made in accordance with the invention;

Figure 2 is an enlarged plan view of a device part of which is shown in elevation in Figure 1;

Figure 3 is a plan view of a modified form of the device shown in Figure 2;

Figure 4 is a plan view of part of an extrusion machine together with another type of bending apparatus made in accordance with the invention;

Figure 5 is an enlarged isometric view of a clamp device shown in Figure 4; and

Figure 6 is a sectional view of a flexible mandrel to be described.

In the arrangement shown in Figures 1 and 2 a thermosetting phenolic-aldehyde composition is fed into a hopper 10 and is forced into a die chamber (not shown) by a punch 11 carried by a ram 12 that is operated hydraulically in known manner. The die chamber is heated by electric heating elements 13 whereby the composition becomes fluid and takes the required shape and then hardens to a solid and fairly rigid state but still capable of being deformed by bending where it issues at the position 15 from the extrusion aperture of the die outlet or nozzle 16. An apertured ring 18 enables jets of compressed air to impinge on the extruding material to cool it, whereby it is rendered rigid and no longer deformable by bending. The cooling by means of the ring 18 hastens the hardening of the bends immediately after formation to minimize spring back or other displacement, and controls the length of the plastic part of the extrusion and determines more exactly the position at which the extrusion hardens to the extent of being no longer deformable during the bending operation. For a tubular extrusion, a plug 19 (Figure 2) engages in the open end and this plug carries a block 20 which abuts against the end of the extrusion and which in turn carries two anti-friction rollers 21, 22. These rollers run respectively on two cam surfaces one of which is shown at 23 and the other of which is not shown. The cam surface 23 is formed on a wooden board 24 arranged on one side of the extrusion (and the other similar cam surface is cut on a similar board that is arranged parallel to the board 24 on the opposite side of the extrusion), and so that the latter runs between them. Another pair of cam boards are provided only one 28 of which is shown and which have cam surfaces 30 corresponding in shape to part of the surfaces 23 so as to form cam tracks therewith.

The arrangement above described and as shown is constructed for producing an article having a straight portion followed by a curve in one direction and then another straight portion followed by a second curve in the opposite direction all being in one plane. The material is allowed to extrude first to the extent of the first straight portion from A to B. The extreme end of the extrusion then moves up the edge cams 23 which have a curvature on a radius larger than the radius of the curvature required on the extrusion, and adapted to bend the extrusion to the required curvature and where necessary slightly beyond to allow for spring back. The curvature B to C is thus produced. The rollers will now run in the straight part 35 of the cam track and some spring back may occur at this time. At this time also the second straight part C to D of the extrusion is extruded and the curve will not be bent in any other direction. The rollers are now guided down the curved part 37 of the cam track the curvature of which is on a radius very much larger than the radius of the second curvature of the article and is such as to bend the extruding material to the second required curvature and sufficiently beyond to allow for spring back. In this way the curvature D to E is formed. The rollers finally run in the second straight part 38 of the cam track so as to produce the final straight portion E to F of the extrusion. It will be appreciated that each succeeding part of the extrusion hardens so as to retain its previously produced shape and the hardened part of the extrusion is then used as a lever for bending the extruding material at a position closely adjacent to the nozzle of the extruding apparatus. If desired auxiliary cooling and/or heating means may be provided in addition to or in place of the ring 18 for controlling the temperature of the extruded material and thereby also controlling the shape of the extrusion.

The extruded article may be sawn off and the next article produced in exactly the same way. The sawn off article may be placed in a simple form of die or clamps or the like until it is cold and to ensure its retaining the correct required size.

Curvatures of any required shape can be produced by appropriate variation of the shapes of the cams.

In the modification shown in Figure 3 the rollers 21, 22, are mounted on a collar 40 that fits with a fairly tight push fit over the extrusion. This modification is adapted for bending solid or tubular sections.

Figures 4 and 5 show another form of apparatus for carrying out the invention constructed as follows. A board or table 42 is provided on which the extruded material lies during extrusion. This board is fixed in relation to the extrusion machine and is horizontal or at any suitable angle and its surface lies in a plane suitable for supporting the extruding material e. g., tangential to the extrusion aperture of the machine. Pivoted at 43 a distance from said aperture equal to the radius of bend in the required finished extrusion is an arm 44, the movable end of which carries a tubular clamp shown generally in Figure 4 at 45 and shown in detail in Figure 5. The tubular opening in this clamp or at least at its entry end is coaxial with the extrusion aperture when the arm is at right angles to the axis of the aperture. The pivot 43 is in the transverse plane of the outlet end of the extrusion aperture, and the arm is suitably shaped to connect on to one end of the tubular clamp. The clamp extends into the press head 47 and its other end is in contact with the extrusion aperture so as to form a continuation thereof.

The clamp comprises two shaped jaws 48, 49 of several inches in length. These jaws are spaced apart at their lower extremities thus forming an incomplete tube so that the extrusion projects slightly out of the tube radially and contacts with the table so as to lie flat on the table as extrusion proceeds. The jaws may also touch the table. One of these jaws (49) is pivoted at one end at 50 to a bracket 51 that is fixed to a rectangular plate 52 attached by welding to the arm 44, whilst the other jaw is hinged at 54 to the fixed jaw. The jaws have two upwardly extending arms 55, 56, between which is a helical spring 57 which holds the movable jaw in its clamping position. The jaws also carry two upstanding levers 59, 69, which can be moved together against the action of the spring to open the jaws. A locking latch 61 is pivoted to the fixed jaw and has a slot 62 engageable on the aforesaid rectangular plate. In operation the clamp is opened just far enough to enable the extruded material to enter the clamp thereby producing a short length at the beginning of the extrusion which may be straight or curved e. g. from G to H. The clamp may be kept open long enough to produce any straight or curved length. The jaws are then closed to grip the extrusion and as extrusion continues the clamp will be pushed away from the nozzle by the extruding material so that the arm 44 moves about its pivot 43 and causes the extruding material to bend before it becomes too rigid by cooling, and this bend will correspond to the radius of the arm. For a 90° bend the part G to H will reach $G^1$ to $H^1$, the bend being shown at J. The back end of the clamp will meanwhile have moved along the curve K and its front end will have moved along the curve L. When a sufficient length (which may be indicated by markings on the table) has been extruded to this curvature the clamp jaws and the locking latch 61 will be released. The release of the latch permits the clamp to swing about its pivot 50 so that the clamp can be swung over the whole length of the extrusion back to the extrusion aperture and if desired held open whilst a further short length is extruded, whereupon the jaws are again clamped on to the extruding material and the extrusion is sawn off, whereupon the foregoing procedure is repeated.

If desired the arm and/or pivot may be adjustable to provide for different curvatures or the arm or pivot may have an additional movement imparted to it to vary the curvature as may be required.

To ensure accuracy of internal shape of a tubular extrusion a flexible extrusion mandrel may be employed and by this means a curved or straight portion may be produced by continuous extrusion without flattening the tube. The mandrel may comprise a flexible wire rope 70 (Figure 6) carrying a series of flat steel discs 71 which may be say about one eighth or three sixteenths of an inch thick and cambered at their peripheries. The diameter of the steel discs is equal to the internal diameter of the extruding material. These discs are spaced apart by brass separating rings 72. One end of the wire rope is sweated into a bore in a steel collar 73, which has an annular recess 74 containing a helical spring 75 which surrounds the wire rope and is compressed between the collar and the adjacent steel disc. The other end of the wire rope is sweated into a bore in a small block 76 between which and the collar the plates and rings are held together, with the spring compressed. The collar carries a ring 77 which is threaded for connection to the mandrel of the extrusion machine.

The end of the extrusion may be guided in more than one plane and one or more rollers can be used for this purpose.

We claim:

1. A process for extruding from an extrusion aperture a material especially a thermosetting resinous composition which remains only transiently deformable after extrusion, consisting in extruding such material under such conditions that it is deformable on issuing from the said aperture but rapidly becomes rigid, and guiding a rigid part of the extrusion in an accurately predetermined path in such a manner that said part acts through the progressively increasing length of rigid extrusion as a lever which shapes the still deformable material progressively at or near to the extrusion aperture, while maintaining the still deformable extruded material out of contact with surfaces capable of deforming it.

2. An extrusion process as claimed in claim 1 wherein the rigid part of the extrusion is guided in a path having an appropriate shape to produce the required curvature said shape allowing for spring back of the material.

3. A process as claimed in claim 1 wherein the path has successive portions of different shapes.

4. A process as claimed in claim 1 wherein the extrusion is tubular and its rigid extruded part is guided by means engaging in its open end.

5. A process as claimed in claim 1 wherein the rigid extruded part is guided by means which surround the end thereof.

6. An extrusion process as claimed in claim 1 wherein the rigid end of the extruding material is swung about a pivot arm to produce a required shape of bend.

7. Apparatus for extruding from an extrusion aperture a material especially a thermosetting resinous composition which remains only transiently deformable after extrusion, comprising an extrusion machine having an extrusion opening, a device adapted to be attached to the rigid end of the extruding material, means to guide said device in an accurately predetermined curved path to support the still deformable material between said rigid end attached to said device and the extrusion opening of said machine away from any shaping surfaces, said path determining the forming of the material to a required shape progressively only at or near said extrusion opening and only in the direction of bend present in the finished extrusion, and said guide means comprising one or more edge cams.

8. Apparatus for extruding from an extrusion aperture a material especially a thermosetting resinous composition which remains only transiently deformable after extrusion, comprising an extrusion machine having an extrusion opening, a device adapted to be attached to the rigid end of the extruding material, means to guide said device in an accurately predetermined curved path to support the still deformable material between said rigid end attached to said device and the extrusion opening of said machine away from any shaping surfaces, said path determining the forming of the material to a required shape progressively only at or near said extrusion opening and only in the direction of bend present in the finished extrusion, and said means comprising a pair of parallel boards spaced apart to receive the extrusion between them at a point sufficiently remote from the extrusion point, said boards having edge cams engaging the said device to guide the same.

9. Apparatus for extruding from an extrusion aperture a material especially a thermosetting resinous composition which remains only transiently deformable after extrusion, comprising an extrusion machine having an extrusion opening, a device adapted to be attached to the rigid end of the extruding material, means to guide said device in an accurately predetermined curved path to support the still deformable material between said rigid end attached to said device and the extrusion opening of said machine away from any shaping surfaces, said path determining the forming of the material to a required shape progressively only at or near said extrusion opening and only in the direction of bend present in the finished extrusion, said device comprising a plug to fit within the open end of a tubular extrusion, and said guide means comprising anti-friction rollers carried by said plug and guide surfaces engaged by said rollers.

10. Apparatus for extruding from an extrusion aperture a material especially a thermosetting resinous composition which remains only transiently deformable after extrusion, comprising an extrusion machine having an extrusion opening, a device adapted to be attached to the rigid end of the extruding material, means to guide said device in an accurately predetermined curved path to support the still deformable material between said rigid end attached to said device and the extrusion opening of said machine away from any shaping surfaces, said path determining the forming of the material to a required shape progressively only at or near said extrusion opening and only in the direction of bend present in the finished extrusion, said device comprising a tube to fit over the the end of the extrusion, which tube carries anti-friction rollers guided by a cam surface.

11. Apparatus for extruding from an extrusion aperture a material especially a thermosetting resinous composition which remains only transiently deformable after extrusion, comprising an extrusion machine having an extrusion opening, a device adapted to be attached to the rigid end of the extruding material, means to guide said device in an accurately predetermined curved path to support the still deformable material between said rigid end attached to said device and the extrusion opening of said machine away from any shaping surfaces, said path determining the forming of the material to a required shape progressively only at or near said extrusion opening and only in the direction of bend present in the finished extrusion, and a table arranged in a plane suitable for supporting the hardened extruding material e. g. tangentially to the extrusion and the device comprising jaws spaced apart to permit the extrusion to contact with the table.

12. Apparatus for extruding from an extrusion aperture a material especially a thermosetting resinous composition which remains only transiently deformable after extrusion, comprising an extrusion machine having an extrusion opening, a device adapted to be attached to the rigid end of the extruding material, means to guide said device in an accurately predetermined curved path to support the still deformable material between said rigid end attached to said device and the extrusion opening of said machine away from any shaping surfaces, said path determining the forming of the material to a required shape progressively only at or near said extrusion opening and only in the direction of bend present in the finished extrusion, said device comprising a clamp for clamping over the extrusion, and said guide means including a pivoting arm carrying the clamp, the clamp comprising a pair of jaws shaped to surround the extrusion and arranged so that they can be pivotally opened and closed, a bracket on which the jaws are mounted pivotally about an axis parallel to the axis of the pivoting arm, and means to hold the jaws when required against movement about said first-mentioned axis.

DRURY NORMAN DAVIES.
FREDERICK HENRY CHURCHMAN.

REFERENCES CITED

The following references are of record in the file of this patent:

UNITED STATES PATENTS

| Number | Name | Date |
|---|---|---|
| 2,246,236 | Becker | June 17, 1941 |
| 327,292 | McCloskey | Sept. 29, 1885 |
| 785,083 | Brinkman | Mar. 21, 1905 |
| 913,004 | Gordon | Feb. 23, 1909 |
| 783,716 | Brinkman | Feb. 28, 1905 |

FOREIGN PATENTS

| Number | Country | Date |
|---|---|---|
| 314,600 | Great Britain | July 4, 1929 |
| 534,719 | Germany | Oct. 1, 1931 |